No. 780,212. PATENTED JAN. 17, 1905.
T. T. MERRIMAN.
CAN OPENER.
APPLICATION FILED APR. 29, 1904.

Witnesses

Inventor
T. T. Merriman
By P. H. A. B. Lacey
Attorneys

No. 780,212. Patented January 17, 1905.

UNITED STATES PATENT OFFICE.

THOMAS T. MERRIMAN, OF MEDFORD, OREGON.

CAN-OPENER.

SPECIFICATION forming part of Letters Patent No. 780,212, dated January 17, 1905.

Application filed April 29, 1904. Serial No. 205,540.

*To all whom it may concern:*

Be it known that I, THOMAS T. MERRIMAN, a citizen of the United States, residing at Medford, in the county of Jackson and State of Oregon, have invented certain new and useful Improvements in Can-Openers, of which the following is a specification.

This invention relates to improvements in can-openers; and the essential feature of the invention resides in the provision of an implement of this class which may be so cheaply manufactured as to admit of vending same with canned articles.

In its preferred construction the can-opener is made from a single length of wire bent to form a puncturing-prong and cutting-blade, the point and blade being carried by a shank provided with a handle and being made from the single length of wire above mentioned.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1:
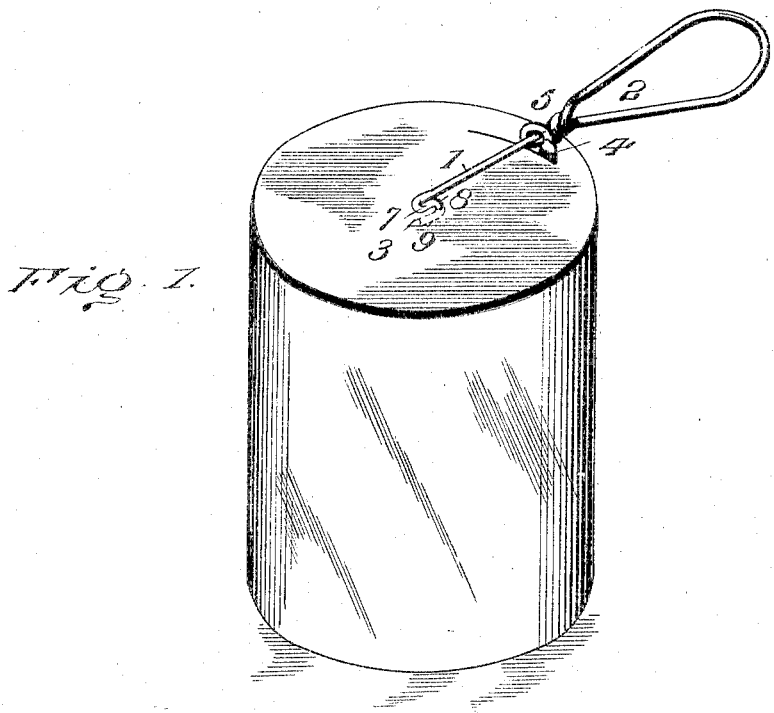
Figure 2:
Figure 3:
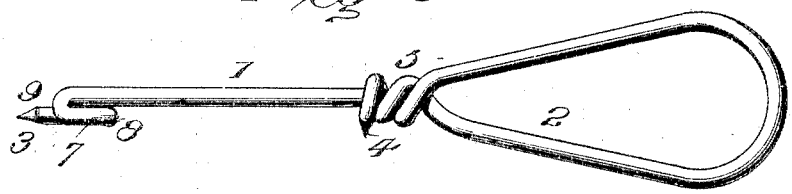

Figure 1 is a perspective view of a can-opener made in accordance with my invention. Fig. 2 is a side elevation. Fig. 3 is a top plan view.

Corresponding and like parts are referred to in the following description and indicated in all the views of the drawings by the same reference characters.

As before premised and referring to the specific structure embodied in the drawings, the implement comprises a shank 1, a handle 2, a puncturing-prong 3, and a cutting-blade 4. The several parts 1, 2, 3, and 4 are formed by bending a single length of wire suitably and in a manner which will now be described. The shank 1 of the implement is provided at one end with the handle 2, which comprises a looped wire from which the device is made, and the end of the wire adjacent the handle 2 is coiled about the shank, as shown at 5, to rigidly reinforce the handle, so as to increase the general substantiality of the article. After the end of the wire has been coiled about the shank 1, as shown at 5, this end is projected downwardly from the shank and sharpened to form the cutting-blade 6. This cutting-blade projects at about right angles to the shank 1 and is adapted to cut the can in the use of the implement. A peculiar form of prong by which the can is initially punctured also constitutes a special feature of my invention, and in the formation of this prong the end of the shank opposite to that adjacent which the handle 2 is located is bent or curved rearwardly, as indicated at 7, downwardly, at 8, and forwardly, as indicated at 9. The downwardly-bent portion 9 of the prong 3 is provided with the point which is designed to pierce the can preparatory to the operation of the implement in removing the top thereof. The construction of the prong 3 prevents any liability of slipping of the prong after the latter has pierced the top of the can preparatory to the cutting operation.

In actual use to remove the top of a can or like receptacle the implement is first operated so as to cause the prong to pierce the central portion of the top of the can. The prong having been introduced into the opening thus formed, the handle of the implement is moved downwardly to cause the blade 4 to cut into the top, and by a pivotal movement of the implement the said top may be entirely or partially severed in a manner readily appreciated. When the blade 4 has cut into the top of the can, the prong cannot be displaced because of this peculiar form, and, further, is not likely to slip in the rotary movement of the shank and handle.

Having thus described the invention, what is claimed as new is—

1. A can-opener comprising a shank, a handle carried by said shank, a cutting-blade, and a prong disposed at one end of the shank and formed by bending the said end rearwardly, downwardly and forwardly, the forwardly-bent portion of the prong being pointed.

2. A can-opener comprising a single length of wire consisting of a shank, the shank being bent at one end to form a prong, the other end portion of the shank being looped to form a handle, and the extremity of the looped portion of the shank being coiled about the shank and projected downwardly and sharpened to form a cutting-blade.

In testimony whereof I affix my signature in presence of two witnesses.

THOMAS T. MERRIMAN. [L. S.]

Witnesses:
C. C. RAGSDALE,
M. PURDIN.